United States Patent

[11] 3,573,523

| [72] | Inventors | Gunther Reich<br>Cologne-Zollstock;<br>Hans-Georg Noller, Walberberg;<br>Wolfdietrich Schulz, Cologne-Bayental,<br>Germany |
|---|---|---|
| [21] | Appl. No. | 755,925 |
| [22] | Filed | Aug. 28, 1968 |
| [45] | Patented | Apr. 6, 1971 |
| [73] | Assignee | Leybold-Heraeus-Verwaltung GmbH<br>Cologne-Bayental, Germany |
| [32] | Priority | Sept. 7, 1967 |
| [33] | | Germany |
| [31] | | L57,383 |

[54] VACUUM GAUGE ARRANGEMENT PROVIDED WITH A FLANGE CONNECTION
12 Claims, 2 Drawing Figs.

[52] U.S. Cl................................................... 313/7,
313/1, 313/46, 324/33
[51] Int. Cl................................................... G01n 27/62,
H01j 41/00
[50] Field of Search.................................... 313/7, 7.5,
63; 250/41.9 (1SA); 313/1, 46; 324/33

[56] References Cited
UNITED STATES PATENTS

| 2,639,397 | 5/1953 | Clark et al. ................... | 313/7 |
| 2,934,665 | 4/1960 | Ziegler .......................... | 250/41.9 |
| 3,164,739 | 1/1965 | Werner ......................... | 313/63X |
| 3,265,918 | 8/1966 | Wittkower.................... | 313/63X |
| 3,450,931 | 6/1969 | Feinstein et al............... | 313/63X |

Primary Examiner—Roy Lake
Assistant Examiner—E. R. LaRoche
Attorney—Spencer and Kaye ABSTRACT: A heat protective electrode positioned between a hot cathode ion source having an ionization chamber and an associated electrode system having an ion collector. The heat protective electrode is connected to a flangelike supporting member which supports the housing in which the electrode system is contained.

Inventors:
Günther Reich
Hans-Georg Nöller
Wolfdietrich Schulz

By: Spencer & Kaye
Attorneys

VACUUM GAUGE ARRANGEMENT PROVIDED WITH A FLANGE CONNECTION

BACKGROUND OF THE INVENTION

The present invention relates to a vacuum gauge arrangement provided with a flange connection and a hot cathode ion source having an ionization chamber wherein ions are formed and transferred to an associated electrode system having an ion collector.

Ionization manometers and mass spectrometers have heretofore been known which have been built into other installations and which have had electrodes attached to a connecting flange. The presence of the hot cathodes results in heating of the adjacent electrodes of the measuring system which can affect sensitive measurements and can lead to errors in the gauge readings, due to gas separation. To avoid this problem, it is known to install completely heatable gauge arrangements. Such arrangements, however, entail relatively complicated structural designs in order to maintain exactly predetermined geometric dimensions.

SUMMARY OF THE INVENTION

The present invention has as an object to improve vacuum gauge arrangements having a flange connection in such a manner as to eliminate the drawback of having to heat the entire arrangement.

The primary feature of the present invention is that a heat protective or insulating electrode is disposed between the ion source and the space provided for the electrode system containing the ion collector. The heat protective electrode, here described, is in communication or contact with the metallic connecting flange of the vacuum gauge system.

In one form, the heat protective electrode is electrically conductive and at the same potential as the connecting flange. The required heat shielding is achieved either by constructing the heat protective electrode of a material having good heat-conducting properties and positioning it in heat-conductive relationship with respect to the connecting flange or by appropriately applying a heat reflecting coating to the surface thereof. Both these embodiments can also be used in combination, if required.

In another form, the heat protective electrode is at the same potential as the metallic connecting flange and is positioned between the electrode system containing the ion collector and the ion source in such a manner and includes a passage opening of such dimension that the heat protective electrode forms an anode for drawing ions created in the ionization chamber of the ion source. It has also been found advantageous to position the heat protective electrode between the ion source having positive potential and an additional electrode for drawing ions having negative potential, which is connected to an input of the electrode system containing the ion collector.

According to the preferred embodiment, a tube-like housing is provided at an outside end of the connecting flange. Such an arrangement defines a chamber which contains the electrode system and the ion collector. The ionization chamber and the hot cathode are positioned outside the housing on the vacuum side of the connecting flange. The ionization chamber is advantageously constructed to have a relatively small surface or thin walls and can be directly or indirectly heated.

A further advantage of the vacuum gauge arrangement, according to the present invention, is that it can, just as well, be used with the high-frequency separator system of a mass spectrometer as well as the electrode system of an ionization manometer.

The heat protective electrode can, advantageously, be formed as a single component with the connecting flange or, alternately, can be formed as a separate element which can be disassembled therefrom.

By an arrangement, according to the present invention, a thermic separation results between the ion source and the chamber in which the electrode system and the ion collector are located. These structural components are shielded against heat radiation from the hot cathode so effectively that undesirable heating is prevented from occurring during operation. Thus, it is not necessary to construct the entire gauge arrangement so that it is heatable.

DETAILED DESCRIPTION OF THE PREFERRED EMBODIMENT

Figure 1:
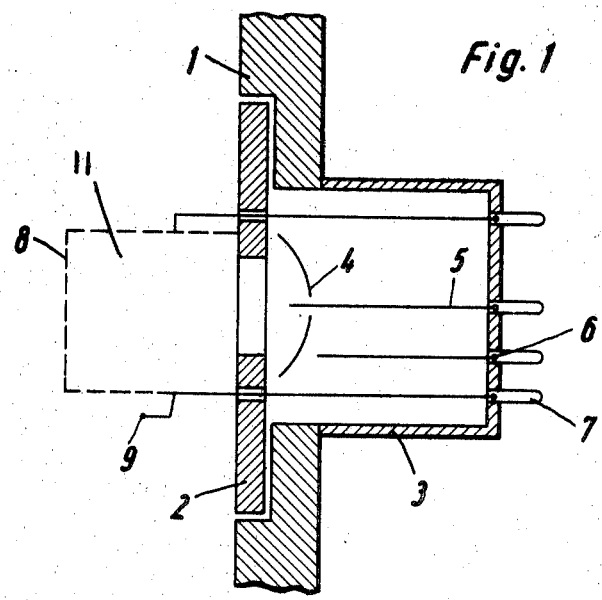
FIG. 1 is a cross-sectional view taken along the length of an ionization manometer, according to the present invention.

FIG. 1 shows a metallic connecting flange 1 into which a likewise metallic apertured partition or diaphragm 2 is inserted to form a good heat-conducting connection. A tubelike housing 3, which houses an electrode system 4 containing an ion collector 5, is attached to the outside end of connecting flange 1. The appropriate connections of the electrode system are brought to prong connections 7 via insulated leads 6 in a manner known in the construction of electrode tube bases. An ion source 8 having an ionization chamber 11 surrounded by a hot cathode 9 is disposed on the vacuum side of the connecting flange 1. The ions formed in the ion source 8 by impact ionization are accelerated by the heat protective electrode 2 in the direction of the subsequent electrode system 4. The heat protective electrode 2 is here at ground potential as is the connecting flange 1.

Figure 2:
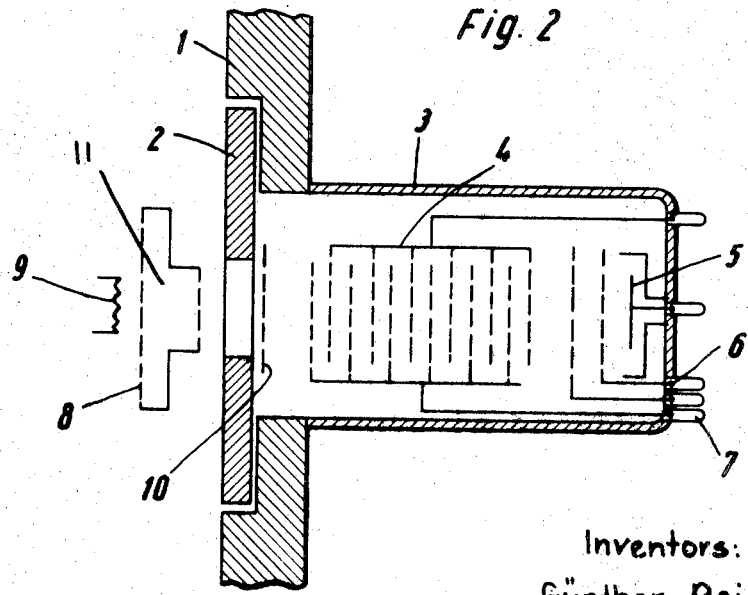
FIG. 2 is a cross-sectional view taken along the length of a mass spectrometer, according to the present invention.

FIG. 2 illustrates the inventive principle in a mass spectrometer arrangement. The components not particularly mentioned correspond to those of FIG. 1. In the tubelike housing 3 the electrode system 4 is now constructed as a high-frequency separator path. Between the electrode system 4 and the heat protective electrode 2 there is an additional electrode 10 having one charge for drawing oppositely charged ions which has a higher negative potential than the heat protective electrode 2. The ion source 8 having ionization chamber 11, in contradistinction to the embodiment shown in FIG. 1, is a box-shaped portion having two covering surfaces which are of a fine wire netting or screen and behind which there is the hot cathode 9.

As shown in the FIGS., flange 1 of the present invention may be in the form of 9 disc having a recess for receiving the APERTURED heat protective electrode 2. In this form, the electrode 2 may be constructed so that the disc can be disassembled from the flange 1.

The heat protective electrode 2 is formed of a material having good electricity conducting properties, as well as good heat conducting properties, for example refined steel, copper, platinum, gold etc.

It will be understood that the above description of the present invention is susceptible to various modifications, changes and adaptations, and the same are intended to be comprehended within the meaning and range of equivalents of the appended claims.

We claim:

1. A vacuum gauge arrangement comprising in combination:
   a. a hot cathode ion source in an ionization chamber;
   b. an electrode system contained in a housing and including an ion collector;
   c. a support member constructed from a material having good heat-conducting properties for supporting said housing and positioned between said ion source and said electrode system;
   d. a heat protective electrode serving as an extractor electrode having a negative potential with respect to said ion source and positioned between said ion source and said electrode system and electrically connected to said support member; and e. said heat-protective electrode being formed of a material having good heat-conducting properties and connected in heat-conductive relationship to said support member.

2. Vacuum gauge arrangement as defined in claim 1 wherein said support member is in the form of a metallic connecting flange.

3. Vacuum gauge arrangement as defined in claim 2, wherein said material having good heat-conducting properties as well as good electricity conducting properties is selected from the group of refined steel, copper, platinum or gold.

4. Vacuum gauge arrangement as defined in claim 2 wherein the heat protective electrode is formed of a material having good electricity conducting properties and which is at the same electrical potential as said metallic flange.

5. Vacuum gauge arrangement as defined in claim 4 wherein said heat protective electrode is positioned between said ion source and said electrode system and includes a passage opening therethrough of such dimension that the heat protective electrode forms an additional electrode having a negative electrical potential with respect to said ion source.

6. Vacuum gauge arrangement as defined in claim 2 further comprising another electrode having a negative electrical potential and being connected to an input of said electrode system and said heat protective electrode is positioned between said ion source having a positive electrical potential and said another electrode.

7. Vacuum gauge arrangement as defined in claim 2 wherein the heat protective electrode is in the form of a disc having an aperture provided therethrough and said flange includes an appropriately formed recess provided therein, said heat protective electrode disc being positioned within said flange recess.

8. A vacuum gauge arrangement as defined in claim 2 wherein the heat protective electrode is formed as a single component together with the flange.

9. Vacuum gauge arrangement as defined in claim 2 wherein said flange includes an outside end and an inside end facing a vacuum, said housing being a tubelike construction and attached to the outside end of said flange and said hot cathode ion source being positioned on the vacuum side of said flange.

10. Vacuum gauge arrangement as defined in claim 2 wherein said heat protective electrode is covered with a heat-reflecting coating.

11. Vacuum gauge arrangement as defined in claim 2 wherein said electrode system is in the form of a high-frequency separator system for use in a mass spectrometer.

12. Vacuum gauge arrangement as defined in claim 2 wherein said electrode system is in the form of an electrode system for use in an ionization manometer.